(12) United States Patent
Lee et al.

(10) Patent No.: US 12,215,251 B2
(45) Date of Patent: Feb. 4, 2025

(54) HOT-MELT ADHESIVE COMPOSITION AND MANUFACTURING METHOD THEREFOR

(71) Applicant: LG Chem, Ltd., Seoul (KR)

(72) Inventors: Se Kyung Lee, Daejeon (KR); Tae Jung Kim, Daejeon (KR); Hyun Woo Kim, Daejeon (KR); Seong Du Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 728 days.

(21) Appl. No.: 17/421,089

(22) PCT Filed: Aug. 12, 2020

(86) PCT No.: PCT/KR2020/010682
§ 371 (c)(1),
(2) Date: Jul. 7, 2021

(87) PCT Pub. No.: WO2021/071079
PCT Pub. Date: Apr. 15, 2021

(65) Prior Publication Data
US 2022/0089921 A1   Mar. 24, 2022

(30) Foreign Application Priority Data

Oct. 8, 2019  (KR) .................. 10-2019-0124524
Aug. 7, 2020  (KR) .................. 10-2020-0098993

(51) Int. Cl.
*C09J 153/02*   (2006.01)
*C08K 5/01*     (2006.01)

(52) U.S. Cl.
CPC ............... *C09J 153/02* (2013.01); *C08K 5/01* (2013.01)

(58) Field of Classification Search
CPC ....... C09J 153/02; C08L 53/025; C08L 71/02; C08L 53/02; C08K 5/053; C08F 8/06; C08F 297/046
See application file for complete search history.

(56) References Cited

U.S. PATENT DOCUMENTS

| | | | |
|---|---|---|---|
| 3,970,608 A * | 7/1976 | Furukawa | C08F 236/04 525/328 |
| 5,399,626 A * | 3/1995 | Erickson | C09D 153/025 525/271 |
| 5,747,598 A | 5/1998 | Coolbaugh et al. | |
| 6,964,996 B1 | 11/2005 | Lee et al. | |
| 2007/0299195 A1 | 12/2007 | de Keyzer et al. | |
| 2011/0105672 A1 | 5/2011 | Kim et al. | |
| 2015/0191637 A1 | 7/2015 | Gillen | |
| 2015/0203725 A1 | 7/2015 | Stafeil et al. | |
| 2018/0258328 A1 | 9/2018 | Nozawa et al. | |
| 2021/0054249 A1 | 2/2021 | Park et al. | |

FOREIGN PATENT DOCUMENTS

| | | |
|---|---|---|
| CN | 107603538 A | 1/2018 |
| EP | 0516203 A2 | 12/1992 |
| EP | 3336153 A1 | 6/2018 |
| JP | H5125197 A | 5/1993 |
| JP | H0725959 A | 1/1995 |
| JP | H07102041 A | 4/1995 |
| JP | H8245939 A | 9/1996 |
| JP | H11279515 A | 10/1999 |
| JP | 20000256637 A | 9/2000 |
| JP | 200568173 A | 3/2005 |
| JP | 20070517099 A | 6/2007 |
| JP | 2017503069 A | 1/2017 |
| KR | 20040032488 A | 4/2004 |
| KR | 20060129337 A | 12/2006 |
| KR | 20110048893 A | 5/2011 |
| KR | 20170036688 A | 4/2017 |
| RU | 2319720 C1 | 3/2008 |
| WO | 2016013156 A1 | 1/2016 |
| WO | 2019132322 A1 | 7/2019 |

OTHER PUBLICATIONS

Extended European Search Report including Written Opinion for Application No. 20874533.1 dated Feb. 9, 2022, pp. 1-6.
Search Report dated Jun. 28, 2023 from Office Action for Russian Application No. 2021119432 issued Jun. 28, 2023. 2 pgs.
Zhongfu Zhao et al, "Synthesis and structure-property relationships of SIS-g-PB copolymers and their application in hot-melt pressure-sensitive adhesives", RSC Advances, vol. 70, No. 7, 2017, pp. 44068-44075.
International Search Report for PCT/KR2020/010682 mailed Nov. 24, 2020; 3 pages.
Hongqiang Li et al., "Preparation and Characterization of Epoxidized Styrene—Isoprene-Styrene Tri-block Copolymer Using Formic Acid-Hydrogen Peroxide", Journal of Elastomers and Plastics, vol. 40, No. 4, 2008, pp. 317-330.
T.-H. Nguyen et al., "Polylactic Acid/Ethylene Glycol Triblock Copolymer as Novel Crosslinker for Epoxidized Natural Rubber", Journal of Applied Polymer Science, vol. 124, No. 1, 2011, pp. 164-174.

* cited by examiner

*Primary Examiner* — Ling Siu Choi
*Assistant Examiner* — Olga Lucia Donahue
(74) *Attorney, Agent, or Firm* — Lerner David LLP

(57) ABSTRACT

A hot melt adhesive composition is provided that includes: a diblock copolymer including a styrene-based monomer-derived unit and a conjugated diene-based monomer-derived unit; a triblock copolymer which is a coupled polymer of the diblock copolymer; and a crosslinked block copolymer including a crosslinking agent-derived crosslinked part crosslinked with two or more of the diblock copolymer and the triblock copolymer. The conjugated diene-based monomer-derived unit includes an isoprene-derived unit and an epoxidized isoprene rubber.

13 Claims, No Drawings

HOT-MELT ADHESIVE COMPOSITION AND MANUFACTURING METHOD THEREFOR

CROSS-REFERENCE TO RELATED APPLICATIONS

The present application is a national stage entry under 35 U.S.C. § 371 of International Application No. PCT/KR2020/010682 filed on Aug. 12, 2020, which claims priority to Korean Patent Application No. 10-2019-0124524 filed on Oct. 8, 2019 and Korean Patent Application No. 10-2020-0098993 filed on Aug. 7, 2020, the entire contents of which are incorporated herein as a part of the specification.

TECHNICAL FIELD

The present invention relates to a hot melt adhesive composition including a block copolymer composition and a method of preparing the same.

BACKGROUND ART

A hot melt adhesive, which is an adhesive using a thermoplastic resin to be melted by heat, thereby forming an adhesive surface, does not use a volatile solvent or the like unlike a conventional UV-curable adhesive to emit less of a harmful substance upon curing, and thus, is preferred as an environment-friendly highly functional adhesive.

The hot melt adhesive is lower-priced than a UV-curable adhesive and is present in a liquid state at a high temperature, and thus, is easily applied and compressed on a substrate and an adherend, and then is cooled and solidified at room temperature within several seconds to exert adhesive strength, and thus, is easily used.

Since the hot melt adhesive is applied to an adherend in a melted state and then cooled to form a hard phase having cohesiveness and creep resistance, the hot melt adhesive is widely used in various industrial fields of industry, such as, diapers or feminine hygiene products, manufacture of pressure sensitive adhesive electronic products such as industrial tape or packaging tape, structural materials, and the like.

Since the hot melt adhesive includes a base resin, an additive, and the like, phase separation and bleeding occur due to compatibility and the like to decrease adhesive strength, a relatively high temperature condition is required during melting processing for adhesion due to high viscosity, and in particular, at the processing temperature condition as such, problems such as viscosity change, odor generation, and discoloration may occur, and thus, a demand for a low-viscosity product is increased.

Accordingly, development of a hot melt adhesive which maintains low-viscosity properties, may improve processing processability, and has excellent adhesive strength and thermal resistance and also excellent physical properties after curing is demanded.

DISCLOSURE

Technical Problem

The present invention was contrived for solving the problems of the background art, and the object of the present invention is to provide a hot melt adhesive composition which has a high softening point so that it may be applied at a high temperature, and also may improve adhesion.

Technical Solution

In one general aspect, a hot melt adhesive composition includes: a diblock copolymer including a styrene-based monomer-derived unit and a conjugated diene-based monomer-derived unit; a triblock copolymer which is a coupled polymer of the diblock copolymer; and a crosslinked block copolymer including a crosslinking agent-derived crosslinked part crosslinked with two or more of the diblock copolymers and the triblock copolymers, wherein the conjugated diene-based monomer-derived unit includes an isoprene-derived unit and an epoxidized isoprene rubber represented by the following Chemical Formula 1:

[Chemical Formula 1]

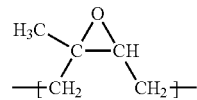

In another general aspect, a method of preparing a hot melt adhesive composition includes: polymerizing a styrene-based monomer in the presence of a hydrocarbon solvent and a polymerization initiator to prepare a styrene-based monomer block (S10); polymerizing the styrene-based monomer block and isoprene to prepare a diblock copolymer including a styrene-based monomer-derived unit and an isoprene-derived unit (S20); coupling two or more of the diblock copolymers and a coupling agent to prepare a triblock copolymer, thereby preparing a block copolymer composition including the triblock copolymer and the diblock copolymer (S30); reacting a part of the isoprene-derived unit included in the diblock copolymer and the triblock copolymer and a mixture of hydrogen peroxide and a carboxylic acid to substitute a part of the isoprene-derived unit with an epoxidized isoprene unit (S40); and crosslinking two or more of the triblock copolymers and the diblock copolymers including the epoxidized isoprene unit with a crosslinking agent to prepare a crosslinked block copolymer (S50).

Advantageous Effects

The hot melt adhesive composition including a diblock copolymer, a triblock copolymer, and a crosslinked block copolymer thereof according to the present invention has improved performance required at a high temperature such as high temperature stability and viscosity retention properties at a high temperature, simultaneously with improved adhesive strength, by functionalizing a part of a conjugated diene-based monomer unit forming a conjugated diene-based monomer block of a copolymer with an epoxy group.

BEST MODE

Hereinafter, the present invention will be described in more detail for better understanding of the present invention.

Since the present invention may be variously modified and may have various forms, it is to be understood that the present invention is not limited to a specific disclosed form, but includes all of the modifications, equivalents, and substitutions within the spirit and technical scope of the present invention.

Meanwhile, the terms and words used in the description and the claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In addition, the terms and the measurement methods used in the present invention may be construed as defined in the following, unless otherwise stated.

Meanwhile, the term, a "monomer-derived repeating unit" or a "monomer-derived unit" in the present invention may refer to a component or a structure resulting from a monomer, or the material itself, or may refer to a unit which is formed in a polymer by the monomer introduced participating a polymerization reaction during polymerization. Furthermore, not only the case in which two or more monomer-derived units are repeated but also the case in which the number of monomer-derived unit is one may be expressed as the monomer-derived repeating unit.

The term "block" in the present invention represents a form of a polymer chain formed by block polymerizing monomers, and may refer to a form in which a plurality of monomer-derived units are continuously connected. For example, a styrene-based monomer block may refer to a polymer chain formed by block polymerization of a styrene-based monomer or an assembly of a plurality of styrene-based monomer-derived units. The term "polymer block" in the present invention may refer to a bundle of polymer chains formed by block polymerization of a monomer.

A hot melt adhesive composition according to an exemplary embodiment of the present invention may include a diblock copolymer, a triblock copolymer, and a crosslinked block copolymer in a crosslinked form of two or more thereof by a crosslinking agent. More specifically, the hot melt adhesive composition according to an exemplary embodiment of the present invention may include a diblock copolymer including a styrene-based monomer-derived unit and a conjugated diene-based monomer-derived unit, a triblock copolymer which is a coupled polymer of the diblock copolymer, and a crosslinked block copolymer including a crosslinking agent-derived crosslinked part crosslinked with two or more of the diblock copolymers and the triblock copolymers.

The diblock copolymer is a diblock copolymer including a styrene-based monomer-derived unit and a conjugated diene-based monomer-derived unit, and the conjugated diene-based monomer-derived unit may include an isoprene-derived unit and an epoxidized isoprene unit represented by the following Chemical Formula 1:

[Chemical Formula 1]

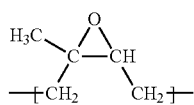

More specifically, the diblock copolymer may be a diblock copolymer which includes a styrene-based monomer block (S) including a styrene-based monomer-derived unit and a conjugated diene-based monomer block (I) including an isoprene-derived unit, in the form of (S)-(I-EI) in which a part of the isoprene-derived unit is functionalized with an epoxy group to be substituted by an epoxidized isoprene unit (EI) represented by Chemical Formula 1.

The triblock copolymer is a coupled polymer prepared by a coupling reaction of two or more diblock copolymers, and representatively, may be a triblock copolymer in the form of (S)-(I-EI)-(S). Meanwhile, the triblock copolymer may further include a coupling agent-derived unit between the conjugated diene-based monomer block (I-EI) and the styrene-based monomer block (S) depending on a coupling agent or a coupling manner.

Meanwhile, the crosslinked block copolymer is a block copolymer which is a crosslinked block copolymer in which two or more of the diblock copolymers and the triblock copolymers are crosslinked by a crosslinking agent, and may include a crosslinking agent-derived crosslinked part in a crosslinked area of the crosslinking agent with the diblock copolymer or the triblock copolymer.

The crosslinking agent includes two or more functional groups which are crosslinkable with the epoxidized isoprene unit represented by Chemical Formula 1 included in the triblock copolymer and the diblock copolymer, and may include a hydroxyl group or an amine group at both ends of the crosslinking agent. The crosslinking agent may be polyalkylene glycol, alkylene glycol, or alkylene diamine, and specifically, may be polyethylene glycol or ethylene glycol.

A styrene-based monomer for forming the styrene-based monomer-derived unit may be styrene, alpha-methylstyrene, para-methylstyrene, vinyl toluene, vinyl naphthalene, para-butyl styrene, or a combination thereof, and specifically styrene.

The styrene-based monomer-derived unit may be produced by polymerization of the styrene-based monomer, and the styrene-based monomer-derived unit included in the hot melt adhesive composition may be included at 10 to 20 parts by weight, specifically 13 to 18 parts by weight, based on a total of 100 parts by weight of the block copolymers including the diblock copolymer and the triblock copolymer.

Since a glass transition temperature (Tg) value of the styrene-based monomer is higher than room temperature, the styrene-based monomer may form a segment unit having a relatively hard nature in the copolymer. Therefore, when a content of the styrene-based monomer-derived unit is 10 parts by weight or more, mechanical physical properties such as hardness of the hot melt adhesive composition including the styrene-based monomer-derived unit may be improved, and simultaneously thermal resistance may be maintained. In addition, when the content of the styrene-based monomer-derived unit is 20 parts by weight or less, an excessive viscosity increase of the hot melt adhesive composition may be suppressed to increase processability, and simultaneously a problem of decreased adhesive strength may be prevented.

Meanwhile, as described above, in the conjugated diene-based monomer-derived unit of the present invention, it is more advantageous for the conjugated diene-based monomer to include isoprene than to include 1,3-butadiene, in terms of adhesion performance of implementing high adhesive property and peel strength as an adhesive blend.

Furthermore, according to an exemplary embodiment of the present invention, in the hot melt adhesive composition including the conjugated diene-based monomer-derived unit in which a part of the isoprene-derived unit is substituted by an epoxidized isoprene unit represented by Chemical formula 1, a phenomenon in which a viscosity of an adhesive is decreased when storing the composition at a high temperature for a long time is prevented, thereby maintaining desired adhesion properties at a high temperature for a longer time. Thus, high thermal stability and good adhesive property may coexist.

From this point of view, the epoxidized isoprene unit included in the hot melt adhesive composition may be included at 0.5 to 5 parts by weight, specifically 1 to 3 parts by weight, based on a total of 100 parts by weight of the isoprene-derived unit and the epoxidized isoprene unit.

When a content of the epoxidized isoprene unit is 5 parts by weight or less, based on a total of 100 parts by weight of the isoprene-derived unit and the epoxidized isoprene unit, viscosity is even increased during storing at a high temperature, so that deterioration of storage and high temperature storage properties may be prevented. Meanwhile, when the content of the epoxidized isoprene unit is 0.5 parts by weight or more, based on a total of 100 parts by weight of the isoprene-derived unit and the epoxidized isoprene unit, a decrease in viscosity of the adhesive during storage at a high temperature for a long time is prevented.

Meanwhile, the diblock copolymer may be included at 15 to 25 parts by weight, based on a total of 100 parts by weight of the diblock copolymer and the triblock copolymer. According to an exemplary embodiment of the present invention, the triblock copolymer may be prepared by performing a coupling reaction on the diblock copolymer including the styrene-based monomer-derived unit and the conjugated diene-based monomer-derived unit, and in this process, a diblock copolymer which does not participate in the coupling reaction may remain and be included in the hot melt adhesive composition. That is, the hot melt adhesive composition of the present invention may include a triblock copolymer and a diblock copolymer which remains without participating in the coupling reaction.

Meanwhile, when a content of the diblock copolymer is within the range, viscosity may be appropriately increased and excellent thermal resistance properties may be implemented.

Meanwhile, the triblock copolymer according to an exemplary embodiment of the present invention may be a coupled polymer of the diblock copolymer, and an example of the coupling agent may be a silane derivative such as dimethylchlorosilane, tetrachlorosilane, dimethyldiethoxysilane, dimethyldimethoxysilane, tetraethoxysilane, and tetramethoxysilane.

The hot melt adhesive composition according to an exemplary embodiment of the present invention may further include a blend for a hot melt adhesive of one or more selected from the group consisting of a tackifier, a plastic oil, and an antioxidant.

A block copolymer including the diblock copolymer, the triblock copolymer, and the crosslinked block copolymer may be included at 10 to 40 parts by weight, based on a total of 100 parts by weight of the hot melt adhesive composition.

The tackifier included in the hot melt adhesive composition may include any one or more of an at least partially hydrogenated rosin ester-based compound and an at least partially hydrogenated dicyclopentadiene-based polymerized petroleum resin. Herein, a rosin has a concept including all of an abietic acid, a dehydroabietic acid in which hydrogen is removed from an abietic acid, and a dihydroabietic acid or a tetrahydroabietic acid to which two or four hydrogens are added, and the abietic acid and the dihydroabietic acid to which two hydrogens are added are used to have a concept of including all various isomers, depending on a position of a double bond.

The rosin ester-based compound is formed by reacting a carboxyl group of an abietic acid with an OH group of alcohol or polyol to be esterified, based on the abietic acid described above or a hydrogenated abietic acid structure, and this also includes all esterified products of natural rosin or modified rosin. The alcohol or polyol is an aliphatic alcohol having 1 to 20 carbon atoms, may be in the form of monoalcohol, diol, triol, tetraol, or pentaol, and more specifically, for example, may be methanol, ethanol, glycerol, ethylene glycol, diethylene glycol, pentaerythritol, or the like. When polyol is used, the abietic acid may be esterified with an entire or a part of a hydroxyl group of polyol, and thus, monoester, divalent ester such as diester, ternary ester, or quaternary ester may be formed.

Meanwhile, the dicyclopentadiene-based polymerization petroleum resin may refer to a petroleum resin including C9-dicyclopentadiene prepared from C5, that is, a cyclopentadiene oil, produced as a by-product in a naphtha cracking process in which naphtha obtained by crude oil refining is decomposed at a high temperature.

The cyclopentadiene produced in the naphtha cracking process is, in most cases, dimerized to be present as a dicyclopentadiene structure, and the cyclopentadiene and the dicyclopentadiene as the dimer thereof may be mutually converted to each other by a Diels-Alder reaction and a retro-Diels-Alder reaction, and in particular, the cyclopentadiene may be polymerized into the dicyclopentadiene by thermal polymerization or catalyst polymerization. Therefore, the expression that the tackifier used in the present invention includes a partially-hydrogenated dicyclopentadiene-based polymerized petroleum resin may mean that at least a part of dicyclopentadiene of the dicyclopentadiene-based compound included in the dicyclopentadiene-based polymerized petroleum resin described above is hydrogenated so that both dicyclopentane and dicyclopentadiene are included.

According to an exemplary embodiment of the present invention, the tackifier may be included at about 200 to about 400 parts by weight or about 250 to about 350 parts by weight, based on a total of 100 parts by weight of the block copolymers including the diblock copolymer, the triblock copolymer, and the crosslinked block copolymer. When the tackifier is included too little, a tackifying effect is insignificant, so that adhesion-related physical properties are not sufficiently exhibited in the hot melt adhesive composition, and when too much of the tackifier is included, cohesion of an adhesive component is decreased, so that in this case also, adhesion-related physical properties may be deteriorated.

Furthermore, the plastic oil included in the hot melt adhesive composition may include a petroleum-based mineral oil. The petroleum-based mineral oil is a liquid by-product produced in a process of refining crude oil into petroleum and also called liquid paraffin and representatively, includes a paraffinic oil based on n-alkane, a naphthenic oil based on cycloalkane, and an aromatic oil based on an aromatic hydrocarbon, and in the present invention, the petroleum-based mineral oil has a concept of including both the oils described above and modified oils thereof. According to an exemplary embodiment of the present invention, the petroleum-based mineral oil is preferably a paraffinic oil, and more preferably, a white oil which is modified by hydrotreatment and/or dewaxing in the presence of a catalyst, or the like.

Meanwhile, the plastic oil may be included at about 50 to about 150 parts by weight, preferably about 70 to about 130 parts by weight, or about 90 to about 110 parts by weight, based on a total of 100 parts by weight of the block copolymers including the diblock copolymer, the triblock copolymer, and the crosslinked block copolymer. When a content of the plastic oil is too low, flowability and low-temperature processability may be deteriorated, and when the content of the plastic oil is too high, viscosity is excessively increased to rather deteriorate adhesion performance.

In addition, the hot melt adhesive composition according to an exemplary embodiment of the present invention may further include an additive such as a photostabilizer, a filler, and a UV absorber known in the art. These additives may be included at about 0.1 to about 10% by weight, based on the entire hot melt adhesive composition, in terms of preventing deterioration of adhesive physical properties, processability, and mechanical physical properties after adhesion.

Meanwhile, according to an exemplary embodiment of the present invention, an adhesive member including a substrate and an adhesive layer formed on at least one surface of the substrate by the hot melt adhesive composition according to an exemplary embodiment of the present invention, is provided.

The adhesive member may be in the form of a film, a tape, or the like, and the substrate may be a film having one layer or a lamination structure of two or more layers, or the like.

A method of preparing a hot melt adhesive composition according to an exemplary embodiment of the present invention will be described.

The method of preparing a hot melt adhesive composition of the present invention may include: polymerizing a styrene-based monomer in the presence of a hydrocarbon solvent and a polymerization initiator to prepare a styrene-based monomer block (S10), polymerizing the styrene-based monomer block and isoprene to prepare a diblock copolymer including a styrene-based monomer-derived unit and an isoprene-derived unit (S20), coupling two or more of the diblock copolymers and a coupling agent to prepare a triblock copolymer, thereby preparing a block copolymer composition including the triblock copolymer and the diblock copolymer (S30), reacting a part of the isoprene-derived unit included in the diblock copolymer and the triblock copolymer and a mixture of hydrogen peroxide and a carboxylic acid to substitute a part of the isoprene-derived unit with an epoxidized isoprene unit (S40), and crosslinking two or more of the triblock copolymers and the diblock copolymers including the epoxidized isoprene unit with a crosslinking agent to prepare a crosslinked block copolymer (S50).

First, a step S10 is a step of polymerizing a styrene-based monomer to prepare a styrene-based monomer block, and the kind of styrene-based monomer may be the same as the kind of styrene-based monomer for forming the styrene-based monomer-derived unit described above.

The hydrocarbon solvent is not particularly limited as long as it does not react with a polymerization initiator and is usually used in a polymerization reaction, but for example, may be one or more selected from the group consisting of linear or branched hydrocarbon compounds such as butane, n-pentane, n-hexane, n-heptane, or isooctane; alkyl-substituted or unsubstituted cyclic hydrocarbon compounds such as cyclopentane, cyclohexane, cycloheptane, methyl cyclohexane, and methyl cycloheptane; and alkyl-substituted or unsubstituted aromatic hydrocarbon compounds such as benzene, toluene, xylene, and naphthalene.

In addition, the hydrocarbon solvent may include a polar additive for adjusting a vinyl content and improving a polymerization rate, and the polar additive may be for example, one or more selected from the group consisting of tetrahydrofuran, ethyl ether, tetramethyl ethylene diamine, and benzofuran.

In addition, the polymerization initiator is not particularly limited as long as it is usually used in anionic polymerization, but for example, may be one or more selected from the group consisting of n-butyllithium, sec-butyllithium, tert-butyllithium, methyllithium, ethyllithium, isopropyllithium, cyclohexyllithium, allyllithium, vinyllithium, phenyllithium, and benzyllithium.

Next, a step S20 of polymerizing the styrene-based monomer block prepared as described above and isoprene to prepare a diblock copolymer including a styrene-based monomer-derived unit and an isoprene-derived unit, may be performed. In the present step, the styrene-based monomer block and isoprene may be polymerized in the presence of a hydrocarbon solvent and a polymerization initiator, in which the kinds of hydrocarbon solvent and polymerization initiator may be the same as the kind of hydrocarbon solvent and polymerization initiator used in the step S10.

Next, a step of coupling two or more of the diblock copolymers and a coupling agent to prepare a triblock copolymer may be performed. In this process, as described above, a diblock copolymer which does not participate in the coupling reaction may remain and be included in the hot melt adhesive composition. That is, the hot melt adhesive composition of the present invention may include a block copolymer composition including a triblock copolymer and a diblock copolymer which remains without participating in the coupling reaction together.

The coupling agent derives a coupling reaction between the diblock copolymers, and may be a vinyl group-containing hydrocarbon-based compound such as divinylbenzene; an ester-based compound such as diethyl adipate and glycidyl methacrylate; a silane compound such as dimethyldichlorosilane, tetrachlorosilane, dimethyldiethoxysilane, dimethyldimethoxysilane, tetraethoxysilane, and tetramethoxysilane, as a polyfunctional coupling agent.

Here, the coupling reaction may be performed, for example, under the conditions of a temperature of 30° C. to 150° C. or 60° C. to 130° C. and a pressure of 0.1 bar to 10 bar or 0.5 bar to 5 bar, and within the range, the coupling reaction may be stably performed.

Subsequently, a step S40 of substituting a part of the isoprene-derived unit included in the triblock copolymer and the diblock copolymer with an epoxidized isoprene unit may be performed.

This step may be performed by reacting the isoprene-derived unit included in the triblock copolymer and the diblock copolymer with a mixture of hydrogen peroxide and a carboxylic acid.

The carboxylic acid may be one or more selected from the group consisting of a formic acid, an acetic acid, a trifluoroacetic acid, a benzyloxyformic acid, a dinitrobenzoic acid, and a metachlorobenzoic acid.

Here, the mixture of hydrogen peroxide and a carboxylic acid may include the hydrogen peroxide and the carboxylic acid at a mole ratio of 1:0.8 to 1:3, 1:1 to 1:2, or 1:1.2 to 1:1.7. Within the range, epoxidation of a part of the isoprene-derived unit may be easily performed.

Meanwhile, the mixture of hydrogen peroxide and a carboxylic acid may be used at 0.01 mol to 0.4 mol, specifically 0.02 mol to 0.15 mol, or 0.05 mol to 0.1 mol, based on 1 mol of the isoprene-derived unit included in the triblock copolymer and the diblock copolymer, and within the range, a crosslinking reaction between polymer block chains does not occur to prevent deterioration of physical properties, some isoprene-derived units may be easily epoxidized, and an epoxidation ratio may be controlled to an appropriate range, thereby improving high temperature stability of the hot melt adhesive composition.

An appropriate range of the epoxidation ratio may be a range in which the epoxidized isoprene unit included in the diblock copolymer and the triblock copolymer is included at 0.5 to 5 parts by weight, based on a total of 100 parts by weight of the isoprene-derived unit and the epoxidized isoprene unit. Within the range, an excessive decrease or excessive increase in viscosity during storage of the hot melt adhesive composition at a high temperature for a long time may be prevented.

Next, a step S50 of crosslinking two or more of the diblock copolymers and the triblock copolymers including the epoxidized isoprene unit by a crosslinking agent to prepare a crosslinked block copolymer may be performed.

Specifically, the step S50 may be performed by adding the crosslinking agent during a process of blending the blend for a hot melt adhesive and the block copolymer composition after the step S40. More specifically, a time to add the crosslinking agent may be a time when 70% of an entire period of the blending process has passed, 80% has passed, or 85% has passed from the starting point, that is, a time when 30% of the entire period of the blending process has left, 20% has left, or 15% has left from the time of blending completion.

As an example, the blending process may be performed for a total of 1 hour to 2 hours, 1.2 hours to 1.8 hours, or 1.4 hours to 1.6 hours, and a time to add the crosslinking agent may be 30 minutes, 15 minutes, or 10 minutes before completing the blending process.

Meanwhile, for example, when the crosslinking agent is added at the beginning of blending of the blend for a hot melt adhesive and the block copolymer composition after the step S40, that is, before 50% has passed from the starting point, the crosslinking reaction starts too early to form too much of a crosslinked product, and viscosity may be excessively decreased or excessively increased during storage of the hot melt adhesive composition at a high temperature for a long time.

The blend for a hot melt adhesive may include one or more selected from the group consisting of a tackifier, a plastic oil, and an antioxidant. Specifically, the blend for a hot melt adhesive may include all of the tackifier, the plastic oil, and the antioxidant.

According to an exemplary embodiment of the present invention, a process of mixing the blend for a hot melt adhesive at 100 to 250° C., 120 to 200° C., or 150 to 180° C. may be further performed, before blending the blend for a hot melt adhesive and the block copolymer composition after the step S40.

The crosslinking agent is as described above, and may be used at a mole ratio of 0.1 to 1 or 0.3 to 0.7 relative to 1 mol of the epoxidized isoprene unit included in the block copolymer. Within the range, an excessive decrease or increase in viscosity during storage of the hot melt adhesive composition at a high temperature for a long time may be prevented.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Comparative Example 1

<Preparation of Block Copolymer Composition>

A 10 L reactor substituted with argon (Ar) was set at a temperature of 50° C. and a pressure of 1.0 bar, and cyclohexane (5000 g) and styrene (110 g) were added to the reactor and the mixture was stirred. After stirring for 10 minutes, n-butyllithium (25 g) was added to initiate polymerization. 15 minutes after a polymerization temperature of a styrene monomer reached a highest temperature, an isoprene monomer (558 g) was added to perform polymerization. 10 minutes after a polymerization temperature of isoprene reached a highest temperature, dimethyldichlorosilane (1.0 g) as a coupling agent was added. 10 minutes after adding the coupling agent, methanol as a polymerization terminator was added to complete polymerization, thereby preparing a composition including a diblock copolymer and a triblock copolymer. After stirring 10 minutes, an antioxidant was added. Finally, distilled water was added to a glass reactor equipped with a stirrer, the temperature was maintained at 90° C. by a circulator, and a polymerized product was slowly added using a dropping funnel with stirring to remove cyclohexane. Produced crumbs were dried at a low temperature to prepare a block copolymer composition including a diblock copolymer and a triblock copolymer.

<Preparation of Hot Melt Adhesive Composition>

Kixx Process 600 (GS Caltex) which is a white mineral oil as a plastic oil, SU100 (kolon) as a tackifier, and Irganox 1010 as an antioxidant were added to a 1 L glass beaker, the glass beaker was fixed to a heating mantle at 160° C., stirring was performed at 80 rpm, and after a temperature inside the beaker reached 160° C., stirring was further performed at a higher speed of 100 rpm.

The block copolymer composition prepared in Comparative Example 1 was slowly added dropwise thereto, and stirring was performed at a speed of 100 rpm for 1.5 hours to completely dissolve the block copolymer composition, thereby preparing a hot melt adhesive composition.

Comparative Example 2

A hot melt adhesive composition was prepared in the same manner as in Comparative Example 1, except that after the block copolymer composition including the diblock copolymer and the triblock copolymer was prepared, a mixture of hydrogen peroxide and a formic acid was added, the mixture was reacted with a part of an isoprene-derived unit included in the diblock copolymer and the triblock copolymer at 70° C. for 2 hours, stirring was performed for 10 minutes, and then sodium dimethyldithiocarbamate hydrate (SDD) as a reaction terminator and an antioxidant were added. Here, the hydrogen peroxide and the formic acid was used at 0.035 mol as a total amount of the formic acid and the hydrogen peroxide, based on 1 mol of isoprene used, and the hydrogen peroxide and the formic acid were used at a mole ratio of 1:1.5.

Comparative Example 3

A hot melt adhesive composition was prepared in the same manner as in Comparative Example 2, except that the formic acid and the hydrogen peroxide were used at 0.07 mol as a total amount of the formic acid and the hydrogen peroxide, based on 1 mol of isoprene used.

Comparative Example 4

A hot melt adhesive composition was prepared in the same manner as in Comparative Example 2, except that the formic acid and the hydrogen peroxide were used at 0.175 mol as a total amount of the formic acid and the hydrogen peroxide, based on 1 mol of isoprene used.

Comparative Example 5

A hot melt adhesive composition was prepared in the same manner as in Comparative Example 2, except that the formic acid and the hydrogen peroxide were used at 0.35 mol as a total amount of the formic acid and the hydrogen peroxide, based on 1 mol of isoprene used.

Comparative Example 6

A hot melt adhesive composition was prepared in the same manner as in Comparative Example 3, except that the same moles of polyethylene glycol (PEG) as the moles of an epoxidized isoprene unit included in the triblock copolymer and the diblock copolymer prepared in Comparative Example 3 were added ([epoxy]/[PEG]=1) to crosslink a block copolymer composition to prepare a block copolymer composition including a crosslinked block copolymer, which was used to prepare a hot melt adhesive composition.

Experimental Example 1

A diblock copolymer content, a styrene content, a vinyl content, a TSV viscosity, and an epoxidized isoprene unit content of each of the block copolymer compositions including the diblock copolymer and the triblock copolymer prepared in the above Comparative Examples were analyzed and are shown in the following Table 1.

1) Diblock Copolymer Content

The diblock copolymer content included in the block copolymer composition was expressed as a part by weight based on a total of 100 parts by weight of the diblock copolymer and the triblock copolymer. The diblock copolymer content was measured by GPC using an instrument including Waters 2707 autosampler, Waters 2414 Refractive index detector, and Waters 1515 Isocratic HPLC pump. Tetrahydrofuran (Fisher T425-4) was used as a development solvent for GPC, and a sample was prepared by complete dissolution using a shaker. The thus-prepared sample was added using an autosampler, and an isocratic flow was 1 ml/min. A column temperature was 40° C. both inside and outside. A part having a smaller molecular weight of two peaks of a GPC phase was analyzed and measured.

2) Styrene Content

A total content of a styrene monomer-derived unit based on a total of 100 parts by weight of the diblock copolymer and the triblock copolymer was measured and expressed as a part by weight. Analysis was performed using Varian VNMRS 500 Mhz NMR, and 1,1,2,2-tetrachloroethane D2 available from Cambridge Isotope was used as a solvent. A styrene content was determined by an area value measured by integrating peaks at 7.4 to 6.0 ppm in NMR.

3) Toluene Solution Viscosity (TSV)

The block copolymer composition was dissolved in toluene at a concentration of 25 wt % and the viscosity was measured using a rotary viscometer in a thermostat maintained at 25° C.

4) Vinyl Content

A vinyl content in the diblock copolymer and the triblock copolymer was measured by a 500 Mhz NMR device available from Varian. The vinyl content was expressed as a wt % based on the total weight of the diblock copolymer and the triblock copolymer.

5) Epoxidized Isoprene Unit Content

The epoxidized isoprene unit content included in the diblock copolymer and the triblock copolymer was measured as a content based on a total of 100 parts by weight of the isoprene-derived unit and the epoxidized isoprene unit.

Analysis was performed using Varian VNMRS 500 Mhz NMR, and 1,1,2,2-tetrachloroethane D2 available from Cambridge Isotope was used as a solvent. A functionalized isoprene content was determined as an area value measured by integrating doublet peaks near 2.5 to 3.0 ppm.

TABLE 1

| Classification | Diblock copolymer content (parts by weight) | Styrene content (part by weight) | Vinyl content (wt %) | TSV viscosity (cst) | Epoxy content (part by weight) |
|---|---|---|---|---|---|
| Comparative Example 1 | 19.0 | 15.0 | 10.4 | 1225 | 0 |
| Comparative Example 2 | 19.0 | 15.0 | 10.4 | 1225 | 1 |
| Comparative Example 3 | 19.0 | 15.0 | 10.4 | 1225 | 2 |
| Comparative Example 4 | 19.0 | 15.0 | 10.4 | 1225 | 5 |
| Comparative Example 5 | 19.0 | 15.0 | 10.4 | 1225 | 10 |

Example 1

<Preparation of Block Copolymer Composition>

A block copolymer composition including the diblock copolymer and the triblock copolymer was prepared in the same manner as in Comparative Example 3.

<Preparation of Hot Melt Adhesive Composition>

Kixx Process 600 (GS Caltex) which is a white mineral oil as a plastic oil, SU100 (kolon) as a tackifier, and Irganox 1010 as an antioxidant were added to a 1 L glass beaker, the glass beaker was fixed to a heating mantle at 160° C., stirring was performed at 80 rpm, and after a temperature inside the beaker reached 160° C., stirring was further performed at a higher speed of 100 rpm.

The block copolymer composition prepared in Example 1 was slowly added dropwise thereto, and stirring was performed at a speed of 100 rpm for 1.5 hours to completely dissolve the block copolymer composition, thereby preparing a hot melt adhesive composition. Here, the same moles of polyethylene glycol (PEG) as the moles of the epoxidized isoprene unit included in the diblock copolymer and the triblock copolymer prepared in Example 1 ([epoxy]/[PEG]=1) were added 10 minutes before stirring of the block copolymer composition of Example 1 was completed to crosslink the block copolymer composition of Example 1, thereby preparing a hot melt adhesive composition including a crosslinked block copolymer.

Example 2

A hot melt adhesive composition including a crosslinked block copolymer was prepared in the same manner as in Example 1, except that an amount of polyethylene glycol used was used at a mole ratio of 0.5 relative to the moles of the epoxidized isoprene unit.

Example 3

A hot melt adhesive composition including a crosslinked block copolymer was prepared in the same manner as in Example 1, except that an amount of polyethylene glycol used was used at a mole ratio of 0.33 relative to the moles of the epoxidized isoprene unit.

Example 4

A hot melt adhesive composition including a crosslinked block copolymer was prepared in the same manner as in Example 1, except that ethylene glycol was used instead of polyethylene glycol.

Example 5

A hot melt adhesive composition including a crosslinked block copolymer was prepared in the same manner as in Example 1, except that the block copolymer composition prepared in Comparative Example 4 was used.

Comparative Example 7

A hot melt adhesive composition including a crosslinked block copolymer was prepared in the same manner as in Example 1, except that the block copolymer composition prepared in Comparative Example 5 was used.

Comparative Example 8

A hot melt adhesive composition was prepared in the same manner as in Example 1, except that the block copolymer composition prepared in Comparative Example 1 was used.

<Preparation of Adhesive Membrane>

The hot melt adhesive compositions prepared in the above Examples and Comparative Examples were melted on a roll of a 120° C. hot melt coater for 5 minutes, and the roller of the hot melt coater was passed through so that a thickness of an adhesive layer was 50 μm, to coat the composition on a PET film, thereby preparing an adhesive membrane.

Experimental Example 2

A softening point, an adhesive property, viscosity, peel strength, and a viscosity change rate of the hot melt adhesive compositions prepared in the above Examples and Comparative Examples were measured, and the results are shown in Tables 2 and 3.

1) Softening Point

A sufficient amount of the hot melt adhesive composition was added to a ring, using an automatic softening point analyzer RB 365G Model and allowed to stand for 1 hour, and then a ball (diameter: 9.525 mm, weight: 3.5 g) was placed thereon. A sample was heated at a rate of 5° C./min, and a temperature when the ball descended by 1 inch was measured (related standard: ASTM D36).

2) Adhesive Property

The adhesive property of the adhesive membrane prepared above was measured using LT-1000 loop tack tester. An adhesive membrane sample was cut into a size of a width of 1 inch and a length of 150 mm, folded in half, and fixed to a measuring instrument holder at room temperature, and adhesive strength when the sample was attached to a metal plate and then detached (related standard: ASTM D 6195B).

3) Peel Strength

The adhesive strength of the adhesive membrane prepared above was measured in a manner of 180°-peel, using a texture analyzer (TA). The adhesive membrane sample was cut into a size of a width of 1 inch and a length of 150 mm, and the peel strength was measured at a speed condition of 0.3 m/min at room temperature (related standard: ASTM D1876).

4) Viscosity Change Rate

About 10 g of the hot melt adhesive composition was added to a sample chamber, and a viscosity at 180° C. was measured for 30 minutes, using a Brookfield viscometer (DV2+ Model, Spindle Number 27). Thereafter, the hot melt adhesive composition was allowed to stand at 180° C. for 24 hours, and then the viscosity was measured in the same manner, thereby measuring a viscosity at 180° C. (related standard: ASTM D4402).

TABLE 2

|  | Example 1 | Example 2 | Example 3 | Example 4 | Example 5 |
|---|---|---|---|---|---|
| Epoxy content (part by weight) | 2 | 2 | 2 | 2 | 5 |
| Crosslinking agent addition amount (mole ratio) | 1 | 0.5 | 0.33 | 1 | 1 |
| Softening point (° C.) | 83.7 | 83.3 | 82.9 | 83.5 | 83.3 |
| Adhesive property (g/in$^2$) (loop tack) | 1990 | 1998 | 1989 | 1994 | 2001 |
| Peel strength (g/in) (180° peel strength) | 1.089 | 1.090 | 1.088 | 1.089 | 1.098 |
| Initial viscosity (cps) (180° C., 0 h) | 5483 | 5479 | 5472 | 5473 | 5600 |
| Viscosity after 24 hours (cps) (180° C., 24 h) | 3850 | 4223 | 4271 | 3660 | 5994 |

TABLE 3

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Epoxy content (part by weight) | 0 | 1 | 2 | 5 | 10 | 2 | 10 | 0 |
| Crosslinking agent addition amount (Mole ratio) | 0 | 0 | 0 | 0 | 0 | 1 | 0 | 1 |

TABLE 3-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Softening point (° C.) | 82.8 | 82.4 | 83.4 | 83.1 | 83.8 | — | 84.1 | 87.7 |
| Adhesive property (g/in$^2$) (loop tack) | 1973 | 1994 | 1985 | 1997 | 2003 | — | 2006 | 1975 |
| Peel strength (g/in) (180° peel strength) | 1.041 | 1.072 | 1.081 | 1.088 | 1.095 | — | 1.102 | 1.051 |
| Initial viscosity (cps) (180° C., 0 h) | 5463 | 5350 | 5471 | 5590 | 5687 | — | 5699 | 5470 |
| Viscosity after 24 hours (cps) (180° C., 24 h) | 1425 | 1475 | 1590 | 1775 | 1890 | — | 6523 | 1430 |

As confirmed in Tables 2 and 3, it was confirmed that the Examples of the present invention in which a part of the isoprene monomer-derived unit included in the diblock copolymer and the triblock copolymer is substituted with the epoxidized isoprene-derived unit, and furthermore, during preparation of the hotmelt adhesive composition, a specific crosslinking agent is added to the blending process of the blend for a hot melt adhesive (tackifier, plastic oil, and antioxidant) and the block copolymer composition including the epoxidized isoprene-derived unit (including the diblock copolymer and the triblock copolymer) to include the cross-linked block copolymer in which two or more of the diblock copolymers and the triblock copolymers are crosslinked, were excellent in terms of the adhesive strength with an adherend and the peel strength while maintaining a high softening point. In addition, it was found that since the property of maintaining viscosity during storage at a high temperature was improved, the compositions of the Examples were suitable for use as an adhesive (Examples 1 to 5).

However, the hot melt adhesive composition having no epoxidized isoprene-derived unit (Comparative Example 1) and the hot melt adhesive composition including the epoxidized isoprene-derived unit but no crosslinked block copolymer crosslinked with a specific crosslinking agent (Comparative Examples 2 to 5) had poor peel strength and rapidly decreased viscosity during storage at a high temperature, and thus, were inappropriate for use as a high temperature hot melt adhesive.

Furthermore, in the case in which the crosslinked block copolymer crosslinked with a specific crosslinking agent was included but the epoxidized isoprene-derived unit is excessively included (Comparative Example 7), viscosity rather increased during storage at a high temperature.

In addition, in the case in which though the epoxidized isoprene-derived unit was included and the block copolymer crosslinked with a specific crosslinking agent was included, the time to add the specific crosslinking agent was before preparation of the hot melt composition and after epoxidation (Comparative Example 6), it was confirmed that the block copolymer composition including the crosslinked block copolymer crosslinked by polyethylene glycol (PEG) was not dissolved in the blend for a hot melt adhesive (tackifier, plastic oil, and antioxidant) during preparation of the hot melt adhesive composition, and thus, it was impossible to prepare the hot melt adhesive composition.

In addition, in the case in which a specific crosslinking agent was added to perform crosslinking when the diblock copolymer and the triblock copolymer including no epoxidized isoprene-derived unit were prepared into the hot melt adhesive composition (Comparative Example 8) also, it was confirmed that the peel strength was poor as compared with the Examples, and viscosity maintenance ability during storage at a high temperature was significantly deteriorated.

The invention claimed is:

1. A hot melt adhesive composition comprising:
   a diblock copolymer including a styrene-based monomer-derived unit and a conjugated diene-based monomer-derived unit;
   a triblock copolymer which is a coupled polymer of the diblock copolymer; and
   a crosslinked block copolymer including a crosslinking agent-derived crosslinked part crosslinked with two or more of the diblock copolymers and the triblock copolymers,
   wherein the crosslinking agent-derived crosslinked part is one or more selected from the group consisting of polyalkylene glycol and ethylene glycol, and
   wherein the conjugated diene-based monomer-derived unit includes an isoprene-derived unit and an epoxidized isoprene unit represented by the following chemical formula 1:

[Chemical Formula 1]

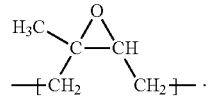

2. The hot melt adhesive composition of claim 1, wherein the epoxidized isoprene unit included in the hot melt adhesive composition is included from 0.5 to 5 parts by weight, based on a total of 100 parts by weight of the isoprene-derived unit and the epoxidized isoprene unit.

3. The hot melt adhesive composition of claim 1, wherein the styrene-based monomer-derived unit included in the hot melt adhesive composition is included from 10 to 20 parts by weight, based on a total of 100 parts by weight of the diblock copolymer and the triblock copolymer.

4. The hot melt adhesive composition of claim 1, wherein the diblock copolymer is included from 15 to 25 parts by weight, based on a total of 100 parts by weight of the diblock copolymer and the triblock copolymer.

5. The hot melt adhesive composition of claim 1, further comprising a blend for a hot melt adhesive, wherein the blend is one or more selected from the group consisting of a tackifier, a plastic oil, and an antioxidant.

6. A method of preparing a hot melt adhesive composition, comprising:
   polymerizing a styrene-based monomer in the presence of a hydrocarbon solvent and a polymerization initiator to prepare a styrene-based monomer block;

polymerizing the styrene-based monomer block and isoprene to prepare a diblock copolymer including a styrene-based monomer-derived unit and an isoprene-derived unit;

coupling two or more of the diblock copolymers and a coupling agent to prepare a triblock copolymer, thereby preparing a block copolymer composition including the triblock copolymer and the diblock copolymer;

reacting a part of the isoprene-derived unit included in the diblock copolymer and the triblock copolymer and a mixture of hydrogen peroxide and a carboxylic acid to substitute a part of the isoprene-derived unit with an epoxidized isoprene unit; and crosslinking two or more of the triblock copolymers and the diblock copolymers including the epoxidized isoprene unit with a crosslinking agent to prepare a crosslinked block copolymer, wherein the crosslinking agent is one or more selected from the group consisting of polyalkylene glycol and ethylene glycol.

7. The method of claim 6, wherein the hydrogen peroxide and the carboxylic acid is used at 0.01 mol to 0.4 mol, based on 1 mol of the isoprene-derived unit included in the diblock copolymer and the triblock copolymer.

8. The method of claim 6, wherein the carboxylic acid is one or more selected from the group consisting of a formic acid, an acetic acid, a trifluoroacetic acid, a benzyloxyformic acid, a dinitrobenzoic acid, and a metachlorobenzoic acid.

9. The method of claim 6, wherein the mixture of the hydrogen peroxide and the carboxylic acid includes the hydrogen peroxide and the carboxylic acid at a mole ratio of 1:0.8 to 1:3.

10. The method of claim 6, wherein the epoxidized isoprene unit included in the diblock copolymer and the triblock copolymer is included from 0.5 to 5 parts by weight, based on a total of 100 parts by weight of the isoprene-derived unit and the epoxidized isoprene unit.

11. The method of claim 6, wherein the crosslinking two or more of the triblock copolymers and the diblock copolymers is performed by adding the crosslinking agent during a process of blending a blend for a hot melt adhesive and the block copolymer composition.

12. The method of claim 11, wherein the blend for the hot melt adhesive includes one or more selected from the group consisting of a tackifier, a plastic oil, and an antioxidant.

13. The method of claim 6, wherein the crosslinking agent is used at a mole ratio of 0.1 to 1 relative to 1 mol of the epoxidized isoprene unit included in the diblock copolymer and the triblock copolymer.

* * * * *